US012790505B2

(12) United States Patent
Kinjoh et al.

(10) Patent No.: US 12,790,505 B2
(45) Date of Patent: Nov. 10, 2026

(54) CONTINUOUS TYPE INKJET INK COMPOSITION, AND PRINTED MATTER

(71) Applicant: SAKATA INX CORPORATION, Osaka (JP)

(72) Inventors: Jun Kinjoh, Osaka (JP); Ryohei Miyake, Osaka (JP); Shun Kono, Osaka (JP); Okinori Nakashima, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 150 days.

(21) Appl. No.: 18/705,251

(22) PCT Filed: Oct. 3, 2022

(86) PCT No.: PCT/JP2022/036904

§ 371 (c)(1),
(2) Date: May 16, 2025

(87) PCT Pub. No.: WO2023/089968

PCT Pub. Date: May 25, 2023

(65) Prior Publication Data

US 2026/0085204 A1 Mar. 26, 2026

(30) Foreign Application Priority Data

Nov. 22, 2021 (JP) ................................ 2021-189305

(51) Int. Cl.

| | |
|---|---|
| ***B32B 3/02*** | (2006.01) |
| ***C09D 11/033*** | (2014.01) |
| ***C09D 11/037*** | (2014.01) |
| ***C09D 11/104*** | (2014.01) |
| ***C09D 11/107*** | (2014.01) |
| ***C09D 11/328*** | (2014.01) |
| ***C09D 11/36*** | (2014.01) |
| ***C09D 11/52*** | (2014.01) |

(52) U.S. Cl.

CPC ................ *C09D 11/52* (2013.01); *B32B 3/02* (2013.01); *C09D 11/033* (2013.01); *C09D 11/037* (2013.01); *C09D 11/104* (2013.01); *C09D 11/107* (2013.01); *C09D 11/328* (2013.01); *C09D 11/36* (2013.01)

(58) Field of Classification Search

CPC ......... B32B 3/085; B32B 3/14; C09D 11/003; C09D 11/037; C09D 11/10; C09D 11/33; C09D 11/36; C09D 11/328

See application file for complete search history.

(56) References Cited

U.S. PATENT DOCUMENTS

| | | | |
|---|---|---|---|
| 9,080,070 B2 | 7/2015 | Paiz et al. | |
| 2005/0113481 A1 | 5/2005 | Sabys et al. | |
| 2010/0028632 A1* | 2/2010 | Goustiaux | C09D 11/38 428/209 |
| 2013/0260037 A1 | 10/2013 | Paiz et al. | |
| 2014/0378585 A1 | 12/2014 | Li et al. | |
| 2015/0376430 A1* | 12/2015 | Insulaire | C08J 7/0427 428/209 |
| 2017/0190926 A1* | 7/2017 | De Saint-Romain | B41M 5/506 |
| 2021/0040337 A1 | 2/2021 | Kinjoh et al. | |
| 2021/0130633 A1* | 5/2021 | Sabys | C09D 11/322 |
| 2021/0238434 A1 | 8/2021 | Kozee et al. | |
| 2023/0055345 A1 | 2/2023 | Nakashima et al. | |

FOREIGN PATENT DOCUMENTS

| | | |
|---|---|---|
| AU | 2004/226982 | 6/2005 |
| JP | 2000-38530 A | 2/2000 |
| JP | 2000-178487 A | 6/2000 |
| JP | 2001-279138 A | 10/2001 |
| JP | 2010-518214 A | 5/2010 |
| JP | 2012-072236 | 4/2012 |
| JP | 2014-105298 A | 6/2014 |
| JP | 2019-034991 A | 3/2019 |
| JP | 2021-123634 A | 8/2021 |
| WO | WO 2008/098899 A1 | 8/2008 |
| WO | WO 2019/171664 A1 | 9/2019 |

OTHER PUBLICATIONS

Extended Search Report issued in corresponding European Patent Application No. 22895254.5, dated Jan. 31, 2025, in 7 pages.
International Search Report in corresponding PCT/JP2022/036904 issued on Dec. 6, 2022 in 2 pages.
Office Action in corresponding Japanese Patent Application No. 2021-189305 issued on Feb. 2, 2022.
Notification of Transmittal of Translation of the International Preliminary Report on Patentability in International Application No. PCT/JP2022/036904, dated Jun. 6, 2024.
International Preliminary Report on Patentability dated May 2, 2024 in International Application No. PCT/JP2022/036904 dated May 2, 2024.
PCT Written Opinion in International Application No. PCT/JP2022/036904 dated Dec. 6, 2022.
Office Action issued in corresponding Chinese Patent Application No. 202280071469.7 dated Sep. 1, 2026.

* cited by examiner

*Primary Examiner* — Elizabeth E Mulvaney
(74) *Attorney, Agent, or Firm* — Knobbe Martens Olson & Bear LLP

(57) ABSTRACT

A continuous type inkjet ink composition including a dye, a resin, an electrical conductivity imparting agent, and an organic solvent. The dye is an organic dye having a disazo backbone. The electrical conductivity imparting agent is an ionic compound having, at an anionic portion thereof, at least one of phosphorus and boron. The continuous type inkjet ink composition causes the contained dye to be dissolved therein, and enables obtaining of a printed matter having excellent retort resistance.

16 Claims, No Drawings

CONTINUOUS TYPE INKJET INK COMPOSITION, AND PRINTED MATTER

This application is the U.S. National Phase under 35 U.S.C. § 371 of International Application PCT/JP2022/036904, filed Oct. 3, 2022, designating the U.S., and published in Japanese as WO 2023/089968 on May 23, 2023, which claims priority to Japanese Patent Application No. 2021-189305, filed Nov. 22, 2021, the entire content of which is incorporated herein by reference.

TECHNICAL FIELD

The present invention relates to a continuous type inkjet ink composition and a printed matter.

BACKGROUND ART

The inkjet recording method used in the inkjet printer is roughly classified into two methods of a continuous method and a drop-on-demand method. Here, the continuous method is an inkjet recording method characterized by continuously jetting ink droplets and deflecting a jetting path by an electrical force, so that only ink droplets necessary for recording image formation are caused to land on a recording medium, and remaining ink droplets are collected and repeatedly used. On the other hand, the drop-on-demand method is an inkjet recording method characterized by intermittently jetting only ink droplets necessary for recording image formation and causing the ink droplets to directly land on a recording medium.

Due to this difference in principle, in addition to a device that directly ejects ink from a nozzle under pressure or jets ink as small droplets by ultrasonic waves, a continuous recording device requires an electrode that charges and deflects ink droplets to deflect the jetting path, making the configuration complex and large compared with the drop-on-demand recording device. However, when the ink droplets are constantly jet, the ink droplets are superior in responsiveness to the case of jetting the ink at required points in time. Thus, the continuous recording device can record at a higher speed, and is characterized by high ejection reliability even when a fast-drying ink is used. Therefore, the continuous recording device is mainly used for industrial use in a field where there are a large number of recording media and recording is performed for a long time, and in a field where fast-drying ink is required for a non-absorbent recording medium.

In general, a continuous type inkjet ink composition is known to mainly contain a colorant, a resin, an organic solvent, and if necessary, a conductivity imparting agent (charge controlling agent) (for example, Patent Documents 1 to 4).

PRIOR ART DOCUMENT

Patent Documents

Patent Document 1: JP-A-2000-38530
Patent Document 2: JP-A-2000-178487
Patent Document 3: JP-A-2010-518214
Patent Document 4: JP-A-2014-105298

SUMMARY OF THE INVENTION

Problems To Be Solved By The Invention

A retort pouch food product obtained by filling a food product in a packaging container (printed matter) formed of the recording medium (plastic film or the like) needs to be heat-sterilized (retort sterilization treatment) with high-temperature hot water exceeding 100° C., high-temperature steam, or the like under pressure in a production process thereof. However, in the case of using the ink composition disclosed in the above patent documents, it has been found that, under such retort sterilization treatment, there are problems that the contained colorant is eluted from the printed matter and the printed matter is whitened by the contained conductivity imparting agent (charge controlling agent).

Further, from the viewpoint of maintainability such as nozzle clogging, the colorant is desirably a dye that is easily dissolved in the organic solvent, rather than a pigment that is not dissolved in an organic solvent usually used in a continuous type inkjet ink composition and has a solid-liquid phase interface.

The present invention has been made in view of the above circumstances, and an object thereof is to provide a continuous type inkjet ink composition in which the contained dye is dissolved and a printed matter excellent in retort resistance is obtained.

MEANS FOR SOLVING THE PROBLEMS

That is, the present invention relates to a continuous type inkjet ink composition containing: a dye; a resin; a conductivity imparting agent; and an organic solvent, wherein the dye is an organic dye having a disazo backbone, and the conductivity imparting agent is an ionic compound having, at an anionic portion thereof, at least one element selected from the group consisting of phosphorus and boron.

The present invention also relates to a printed matter in which a printed layer formed from the continuous type inkjet ink composition is provided on a base material.

Effect of the Invention

Though the details of the mechanism of action of the effect in the continuous type inkjet ink composition of the present invention are partially unknown, they are presumed as follows. However, the present invention is not construed as being limited to this mechanism of action.

The continuous type inkjet ink composition of the present invention contains a dye, a resin, a conductivity imparting agent, and an organic solvent. The dye is an organic dye having a disazo backbone, and by such a structure, the contained dye is hardly eluted from the printed matter even under the retort sterilization treatment. Further, the conductivity imparting agent is an ionic compound having, at an anionic portion thereof, at least one element selected from the group consisting of phosphorus and boron. By such a structure, the printed matter under the retort sterilization treatment is hardly whitened, and the ink composition containing the compound has conductivity suitable for the continuous method.

MODE FOR CARRYING OUT THE INVENTION

The continuous type inkjet ink composition of the present invention contains a dye, a resin, a conductivity imparting agent, and an organic solvent.

The dye is an organic dye having a disazo backbone. The organic dye only needs to be completely dissolved in the organic solvent in the continuous type inkjet ink composition. For example, the organic dye can be dissolved in an amount of preferably 2 parts by mass or more, more preferably 5 parts by mass or more, still more preferably 10 parts by mass or more based on 100 parts by mass of methyl ethyl ketone at 25° C. The organic dye having a disazo backbone is not limited in hue, and examples thereof include C.I. Solvent Orange 14, C.I. Solvent Red 23, C.I. Solvent Red 24, C.I. Solvent Red 25, C.I. Solvent Red 27, and C.I. Solvent Black 3. The dye can be used singly or in combination of two or more types thereof.

The resin may be any binder resin used in conventional continuous type inkjet ink compositions. Examples of the resin include polyester resins, acrylic resins, vinyl chloride-based resins, vinyl chloride-vinyl acetate-based resins, ethylene-vinyl acetate-based resins, styrene-acrylic resins, styrene-maleic acid-based resins, rosin-based resins, rosin ester-based resins, petroleum resins, coumarone-indene-based resins, terpene phenol-based resins, phenol resins, urethane resins, melamine resins, urea resins, epoxy-based resins, cellulose-based resins, xylene resins, alkyd resins, aliphatic hydrocarbon resins, butyral resins, maleic acid resins, and fumaric acid resins. Among them, the resin is preferably a polyester resin, an acrylic resin, or a vinyl chloride-vinyl acetate-based resin from the viewpoint of excellent adhesion to the base material and solubility. The resin can be used singly or in combination of two or more types thereof.

The conductivity imparting agent is an ionic compound having, at an anionic portion thereof, at least one element selected from the group consisting of phosphorus and boron. Examples of the ionic compound include hexafluorophosphates such as potassium hexafluorophosphate, sodium hexafluorophosphate, and tetrabutylammonium hexafluorophosphate; tetrafluoroborates such as sodium tetrafluoroborate; and tetraphenylborates such as tetrabutylammonium tetraphenylborate. The conductivity imparting agent can be used singly or in combination of two or more types thereof.

The organic solvent may be any organic solvent used in conventional continuous type inkjet ink compositions. Preferred examples of the organic solvent to be contained include ketones such as methyl ethyl ketone, diethyl ketone, dimethyl ketone, methyl-n-propyl ketone, methyl-iso-propyl ketone, methyl n-butyl ketone, and methyl isobutyl ketone; monohydric alcohols such as methanol, ethanol, n-propanol, isopropanol, n-butanol, amyl alcohol, benzyl alcohol, cyclohexanol, diacetone alcohol, and isobutanol; dihydric alcohols such as ethylene glycol, diethylene glycol, trimethylene glycol, triethylene glycol, tetraethylene glycol, polyethylene glycol, and propylene glycol; and alkyl esters such as methyl lactate, butyl lactate, methyl acetate, ethyl acetate, n-propyl acetate, isopropyl acetate, n-butyl acetate, and isobutyl acetate. Examples of the organic solvent include alkylene glycol monoalkyl ethers such as ethylene glycol monomethyl ether, diethylene glycol monoethyl ether, diethylene glycol monobutyl ether, propylene glycol monomethyl ether, propylene glycol monoethyl ether, and dipropylene glycol monoethyl ether; alkylene glycol monoacetates such as ethylene glycol monoacetate and propylene glycol monoacetate; alkylene glycol monoalkyl ether monoacetates such as ethylene glycol monomethyl ether monoacetate and propylene glycol monomethyl ether monoacetate; lactones such as γ-butyrolactone; nitrogen-containing compounds such as amides, morpholine, and pyridine; acyclic acetals such as ethylal, methylal, acetal, and dimethyl acetal. The organic solvent can be used singly or in combination of two or more types thereof. In particular, an organic solvent containing methyl ethyl ketone, or methanol or ethanol is preferable as the organic solvent for enhancing the electrical conductivity of the ink and the ink drying properties. When the conductivity imparting agent is not dissolved in methyl ethyl ketone, or methanol or ethanol, an appropriate amount of the organic solvent in which the conductivity imparting agent is dissolved is added.

The proportion of the dye in the inkjet ink composition is preferably 1% by mass or more, more preferably 2% by mass or more from the viewpoint of improving the printing density of the printed matter, and is preferably 15% by mass or less, more preferably 12% by mass or less from the viewpoint of improving ejection stability. That is, the proportion of the dye in the inkjet ink composition is preferably 1% by mass or more and 15% by mass or less, and more preferably 2% by mass or more and 12% by mass or less from the viewpoint of improving the printing density of the printed matter and ejection stability.

The proportion of the resin in the inkjet ink composition is preferably 1% by mass or more, more preferably 2% by mass or more from the viewpoint of improving adhesion to various printing base materials and the strength of the ink film itself, and is preferably 15% by mass or less, more preferably 12% by mass or less from the viewpoint of improving ejection stability. That is, the proportion of the resin in the inkjet ink composition is preferably 1% by mass or more and 15% by mass or less, and more preferably 2% by mass or more and 12% by mass or less from the viewpoint of improving adhesion to various printing base materials and the strength of the ink film itself and ejection stability.

The proportion of the conductivity imparting agent in the inkjet ink composition is preferably 0.05% by mass or more, more preferably 0.1% by mass or more from the viewpoint of improving conductivity, and is preferably 3% by mass or less, more preferably 2% by mass or less from the viewpoint of improving storage stability. That is, the proportion of the conductivity imparting agent in the inkjet ink composition is preferably 0.05% by mass or more and 3% by mass or less, and more preferably 0.1% by mass or more and 2% by mass or less from the viewpoint of improving conductivity and storage stability.

The proportion of the organic solvent in the inkjet ink composition is an amount obtained by subtracting the total amount of the dye, the resin, the conductivity imparting agent, and other additives to be used as necessary from the total amount of the ink composition. The proportion may be appropriately changed so that the ink viscosity falls within the range described later. The proportion of the organic solvent in the inkjet ink composition is, for example, preferably 60% by mass or more, more preferably 70% by mass or more from the viewpoint of improving ejection stability, and is preferably 95% by mass or less, more preferably 90% by mass or less from the viewpoint of improving printability. That is, the proportion of the organic solvent in the inkjet ink composition is preferably 60% by mass or more and 95% by mass or less, and more preferably 70% by mass or more and 90% by mass or less from the viewpoint of improving ejection stability and printability. Further, the total content (proportion) of ketones, monohydric alcohols, dihydric alcohols, and alkyl esters in the organic solvent may be set such that the ink viscosity falls within the range described later. The total proportion thereof is, for example, preferably 80% by mass or more, more preferably 90% by mass or more, and still more preferably 95% by mass or more. The content of acyclic acetals such as ethylal, methylal, acetal, and dimethyl acetal is preferably less than 10% by mass, and more preferably 5% by mass or less in the inkjet ink composition since the dissociation ability of the conductivity imparting agent is low.

The total proportion of the dye, the resin, the conductivity imparting agent, and the organic solvent in the inkjet ink composition is preferably 80% by mass or more, more preferably 90% by mass or more, and still more preferably 95% by mass or more from the viewpoint of improving the suitability for the continuous type inkjet method.

Further, in the continuous type inkjet ink composition of the present invention, from the viewpoint of improving the suitability for the continuous type inkjet method, the organic solvent preferably contains 80% by mass or more of one or more of ketones, monohydric alcohols, dihydric alcohols, and alkyl esters, the total proportion of the dye, the resin, the conductivity imparting agent, and the organic solvent in the inkjet ink composition is preferably 80% by mass or more, and the proportion of the acyclic acetal in the inkjet ink composition is preferably less than 10% by mass. Further, in the continuous type inkjet ink composition of the present invention, from the viewpoint of improving the suitability for the continuous type inkjet method, the organic solvent preferably contains 90% by mass or more of one or more of ketones, monohydric alcohols, dihydric alcohols, and alkyl esters, the total proportion of the dye, the resin, the conductivity imparting agent, and the organic solvent in the inkjet ink composition is preferably 90% by mass or more, and the proportion of the acyclic acetal in the inkjet ink composition is more preferably 5% by mass or less.

Further, in the continuous type inkjet ink composition of the present invention, from the viewpoint of improving the suitability for the continuous type inkjet method, the organic solvent preferably contains 95% by mass or more of one or more of ketones, monohydric alcohols, dihydric alcohols, and alkyl esters, and the total proportion of the dye, the resin, the conductivity imparting agent, and the organic solvent in the inkjet ink composition is preferably 95% by mass or more.

Further, in the continuous type inkjet ink composition of the present invention, various additives such as a viscosity controlling agent, a rust inhibitor, an antifoaming agent, a plasticizer, a surface conditioner, an ultraviolet inhibitor, a light stabilizer, an antioxidant, and the like, and additives such as a silicone-based surfactant, a fluorine-containing surfactant, and the like for the purpose of preventing the spread of dots at the time of ink landing and for enhancing the film performance such as the friction resistance of the printed film can be used as necessary.

Examples of the method for producing the continuous type inkjet ink composition of the present invention include a method in which the above components are charged into a sealed container, stirred, uniformly mixed and dissolved, and then filtered with a membrane filter. Further, the continuous type inkjet ink composition is suitably set to have a viscosity of about 2 to 5 mPa·s and an impedance of about $1.2\times10^{2}$ to $1\times10^{1}\Omega$ as a guide for obtaining jetting stability of the ink droplet. Here, the viscosity of the ink composition is a value measured by an E-type viscometer at a liquid temperature of 25° C.

In the printed matter of the present invention, a printed layer formed from the continuous type inkjet ink composition is provided on a base material. The base material may be any of metal, paper, and plastic, and examples of the printed matter include various packaging materials such as beverage cans, beverage containers, food containers, and pharmaceutical packaging.

EXAMPLES

Hereinafter, the present invention will be described with reference to Examples and the like, but the present invention is not limited thereto.

Examples 1 to 5 and Comparative Examples 1 to 6

Each material was stirred and mixed by a high-speed stirrer according to the mass ratio (mass %) shown in the following Table 1 to produce a continuous type inkjet ink composition.

Using the continuous type inkjet ink composition obtained above, evaluation was performed by the following method. The results are presented in Table 1.

Solubility

The ink composition (40 g) was passed through a 250 mesh net, and the residue was visually confirmed.

Evaluation Criteria

○: There is no residue.

x: There is a residue.

<Conductivity>

The impedance was measured with an impedance analyzer. The impedance is a measured value of impedance in a frequency range of $1\times10^{3}$ to $1\times10^{6}$ Hz under an alternating current of a voltage of 200 mV using a frequency response analyzer (FRA) type 1255 and a dielectric constant measurement interface type 1296 (both manufactured by Solartron Analytical UK) with an amount of the ink composition of 2 ml.

[Evaluation Criteria]

○: less than 200Ω.

x: 200Ω or more.

<Retort-Resistance (Dye)>

The ink composition was developed on a polyethylene terephthalate (PET) film (Toyobo Co., Ltd., E5100) using a No. 4 (φ0.1 mm) bar coater, and then dried to obtain a developed product. This developed product was subjected to a retort treatment in pressurized hot water at 120° C. for 30 minutes using a retort tester (manufactured by Miura Co., Ltd., JQ-501NA). The retort resistance of the dye was evaluated from the degree of elution of the printed portion after the treatment.

[Evaluation Criteria]

○: Some or all of the printed portions remain.

x: All the printed portions were eluted.

<Retort Resistance (Conductivity Imparting Agent)>

In the retort treatment, the retort resistance of the conductivity imparting agent was evaluated from the presence or absence of whitening of the coating film.

[Evaluation Criteria]

○: There is no whitening of the coating film.

x: There is whitening of the coating film.

TABLE 1

| | | | Example | | | | |
|---|---|---|---|---|---|---|---|
| | | | 1 | 2 | 3 | 4 | 5 |
| Dye | Solvent Black 3 | Disazo dye | 10.0% | 10.0% | 10.0% | 10.0% | 10.0% |
| | Solvent Black 5 | Nigrosin | | | | | |
| | Solvent Black 27 | Chromium complex | | | | | |
| | Solvent Bleck 29 | Chromium complex | | | | | |
| Conductivity imparing agent | $KPF_6$ | Potassium hexafluorophosphate | 0.5% | | | 0.5% | |
| | $N[CH_3(CH_2)_3]_4PF_6$ | Tetrabutylammonium hexafluorophosphate | | 1.0% | | | 1.0% |
| | $N[CH_3(CH_2)_3]_4BPh_4$ | Tetrabutylammonium tetraphenylborate | | | 1.0% | | |
| | KSCN | Potassium thiocyanate | | | | | |
| | NaSCN | Sodium thiocyanate | | | | | |
| Resin | Polyester resin | VYLON 200 manufactured by Toyobo Co., Ltd. | 10.0% | 10.0% | 10.0% | | |
| | Acrylic resin | DIANAL BR-80 manufactured by Mitsubishi Chemical Corporation | | | | 10.0% | |
| | Vinyl chloride-vinyl acetate-based resin | SOLBIN C5R manufactured by Nissin Chemical Industry Co., Ltd. | | | | | 5.0% |
| Organic solvent | MEK | Methyl ethyl ketone | 79.5% | 79.0% | 79.0% | 79.5% | 84.0% |
| | | Total | 100% | 100% | 100% | 100% | 100% |
| Evalualuation | | Solubility | ○ | ○ | ○ | ○ | ○ |
| | | Conductivity | 70 Ω | 100 Ω | 100 Ω | 70 Ω | 100 Ω |
| | | Retort resistance (dye) | ○ | ○ | ○ | ○ | ○ |
| | | Retort resistance (conductivity imparting agent) | ○ | ○ | ○ | ○ | ○ |

| | | | Comparative Example | | | | | |
|---|---|---|---|---|---|---|---|---|
| | | | 1 | 2 | 3 | 4 | 5 | 6 |
| Dye | Solvent Black 3 | Disazo dye | | | | 10.0% | 10.0% | 16.0% |
| | Solvent Black 5 | Nigrosin | | | 10.0% | | | |
| | Solvent Black 27 | Chromium complex | 10.0% | | | | | |
| | Solvent Bleck 29 | Chromium complex | | 10.0% | | | | |
| Conductivity imparing agent | $KPF_6$ | Potassium hexafluorophosphate | | | 0.5% | | | |
| | $N[CH_3(CH_2)_3]_4PF_6$ | Tetrabutylammonium hexafluorophosphate | | | | | | |
| | $N[CH_3(CH_2)_3]_4BPh_4$ | Tetrabutylammonium tetraphenylborato | | | | | | |
| | KSCN | Potassium thiocyanate | | | | | 0.5% | |
| | NaSCN | Sudium thiocyanate | | | | | | 0.5% |
| Resin | Polyester resin | VYLON 200 manufactured by Toyobo Co., Ltd. | 10.0% | 10.0% | 10.0% | 10.0% | 10.0% | 10.0% |
| | Acrylic resin | DIANAL BR-80 manufactured by Mitsubishi Chemical Corporation | | | | | | |
| | Vinyl chloride-vinyl acetate-based resin | SOLBIN C5R manufactured by Nissin Chemical Industry Co., Ltd. | | | | | | |
| Organic solvent | MEK | Methyl ethyl ketone | 80.0% | 80.0% | 79.5% | 80.0% | 79.5% | 79.5% |
| | | Total | 100% | 100% | 100% | 100% | 100% | 100% |
| Evalualuation | | Solubility | ○ | ○ | x | ○ | ○ | ○ |
| | | Conductivity | 40 Ω | 40 Ω | — | ≥1000 Ω | 50 Ω | 50 Ω |
| | | Retort resistance (dye) | x | x | — | ○ | ○ | ○ |
| | | Rotors resistance (conductivity imparting agent) | — | — | — | ○ | x | x |

What is claimed is:

1. A continuous type inkjet ink composition comprising:
a dye;
a resin;
a conductivity imparting agent; and
an organic solvent,
wherein
the dye is an organic dye having a disazo backbone,
the conductivity imparting agent is an ionic compound having, at an anionic portion thereof, at least one element selected from the group consisting of phosphorus and boron, and
the organic solvent contains 80% by mass or more, in total, of at least one selected from the group consisting of methyl ethyl ketone, diethyl ketone, methanol, ethanol, and isopropanol.

2. The continuous type inkjet ink composition according to claim 1, wherein the ionic compound is at least one selected from the group consisting of hexafluorophosphate and tetraphenylborate.

3. The continuous type inkjet ink composition according to claim 1, wherein the organic dye is a black dye.

4. The continuous type inkjet ink composition according to claim 1, wherein the resin is at least one selected from the group consisting of a polyester resin, an acrylic resin, and a vinyl chloride-vinyl acetate-based resin.

5. The continuous type inkjet ink composition according to claim 1, wherein a total proportion of the dye, the resin, the conductivity imparting agent, and the organic solvent in the inkjet ink composition is 80% by mass or more, and a proportion of acyclic acetal in the inkjet ink composition is less than 10% by mass.

6. The continuous type inkjet ink composition according to claim 1, wherein the organic solvent contains 95% by mass or more of at least one selected from the group consisting of methyl ethyl ketone, diethyl ketone, methanol, ethanol, and isopropanol, and a total proportion of the dye, the resin, the conductivity imparting agent, and the organic solvent in the inkjet ink composition is 95% by mass or more.

7. A printed matter, wherein a printed layer formed from the continuous type inkjet ink composition according to claim 1 is provided on a base material.

8. The continuous type inkjet ink composition according to claim 2, wherein the organic dye is a black dye.

9. The continuous type inkjet ink composition according to claim 2, wherein the resin is at least one selected from the group consisting of a polyester resin, an acrylic resin, and a vinyl chloride-vinyl acetate-based resin.

10. The continuous type inkjet ink composition according to claim 2, wherein a total proportion of the dye, the resin, the conductivity imparting agent, and the organic solvent in the inkjet ink composition is 80% by mass or more, and a proportion of acyclic acetal in the inkjet ink composition is less than 10% by mass.

11. The continuous type inkjet ink composition according to claim 2, wherein the organic solvent contains 95% by mass or more of at least one selected from the group consisting of methyl ethyl ketone, diethyl ketone, methanol, ethanol, and isopropanol, and a total proportion of the dye, the resin, the conductivity imparting agent, and the organic solvent in the inkjet ink composition is 95% by mass or more.

12. A printed matter, wherein a printed layer formed from the continuous type inkjet ink composition according to claim 2 is provided on a base material.

13. The continuous type inkjet ink composition according to claim 3, wherein the resin is at least one selected from the group consisting of a polyester resin, an acrylic resin, and a vinyl chloride-vinyl acetate-based resin.

14. The continuous type inkjet ink composition according to claim 3, wherein a total proportion of the dye, the resin, the conductivity imparting agent, and the organic solvent in the inkjet ink composition is 80% by mass or more, and a proportion of acyclic acetal in the inkjet ink composition is less than 10% by mass.

15. The continuous type inkjet ink composition according to claim 3, wherein the organic solvent contains 95% by mass or more of at least one selected from the group consisting of methyl ethyl ketone, diethyl ketone, methanol, ethanol, and isopropanol, and a total proportion of the dye, the resin, the conductivity imparting agent, and the organic solvent in the inkjet ink composition is 95% by mass or more.

16. A printed matter, wherein a printed layer formed from the continuous type inkjet ink composition according to claim 3 is provided on a base material.

* * * * *